United States Patent [19]
Lecoco et al.

[11] Patent Number: 5,347,543
[45] Date of Patent: Sep. 13, 1994

[54] DEVICE FOR DIFFERENTIAL-MODE INFORMATION TRANSMISSION BETWEEN AT LEAST TWO ELEMENTS OF A MOTOR VEHICLE

[75] Inventors: Jean-Luc Lecoco, Sevres; Pierre Magne, Courbevoie, both of France

[73] Assignees: Automobiles Peugeot, Paris; Automobiles Citroen, Neuilly-sur-Seine; Regie Nationale des Usines Renault, Boulogne Billancourt, all of France

[21] Appl. No.: 923,480

[22] Filed: Aug. 3, 1992

[30] Foreign Application Priority Data

Aug. 7, 1991 [FR] France ................................ 91 10070

[51] Int. Cl.$^5$ ............................................. H04B 3/00
[52] U.S. Cl. ..................................... 375/36; 371/8.2; 340/825.03
[58] Field of Search ..................... 375/36, 56; 371/8.2; 340/825.03

[56] References Cited

U.S. PATENT DOCUMENTS

| | | | |
|---|---|---|---|
| 4,792,950 | 12/1988 | Volk et al. | 371/8.2 |
| 4,929,941 | 5/1990 | Lecocq et al. | 375/36 |
| 5,031,176 | 7/1991 | Magne et al. | 371/8.2 |
| 5,073,902 | 12/1991 | Lecocq et al. | 375/36 |

FOREIGN PATENT DOCUMENTS

| | | |
|---|---|---|
| 0295897 | 12/1988 | European Pat. Off. |
| 0318354 | 5/1989 | European Pat. Off. |
| 0329514 | 8/1989 | European Pat. Off. |
| 0404630 | 12/1990 | European Pat. Off. |
| 0427638 | 5/1991 | European Pat. Off. |

Primary Examiner—Stephen Chin
Assistant Examiner—T. Ghebretinsae
Attorney, Agent, or Firm—Burns, Doane, Swecker & Mathis

[57] ABSTRACT

This device in which the elements are linked by two information transmission lines (2, 3) and each of which includes information sending and reception circuits (4, 5), linked to a protocol handler (6), is characterized in that the reception circuit (5) of each element (1) comprise three comparators (7, 8, 9), a first comparator (7) receiving the signals transiting on the two lines (2, 3), a second comparator (8) receiving the signals transiting on a line (2) and a third comparator (9) receiving the signals transiting on the other line (3) and, interposed between the output of these comparators (7, 8, 9) and the information input (RC) of the handler (6), a circuit (10) for selective connection of the output (R0) of the first comparator (7) or of the output of a circuit for logically combining the outputs (R1, R2) of the second and third comparators (8, 9), to the input of the protocol handler (6), under the control of the latter as a function of the state of the signals present at its input, in order to permit operation of the device in normal differential mode and in degraded mode on the basis of information transiting on one of the lines.

12 Claims, 1 Drawing Sheet

DEVICE FOR DIFFERENTIAL-MODE INFORMATION TRANSMISSION BETWEEN AT LEAST TWO ELEMENTS OF A MOTOR VEHICLE

BACKGROUND OF THE INVENTION

1) Field of the Invention

The present invention relates to a device for differential-mode information transmission between at least two elements of a motor vehicle, linked by two information transmission lines.

2) Discussion of Related Art

In these devices, each element comprises information sending means and information reception means, linked to a protocol handler.

These differential-mode information transmission devices have been developed during the definition of transmission systems for motor vehicles, because of a certain number of problems linked to these applications and especially parasites which are capable of disturbing these transmissions.

The use of differential transmission makes it possible to obtain a good immunity to these parasites but it exhibits a certain number of drawbacks in the matter of its reliability.

In fact, the latter is linked to the reliability of the connections (microbreaks, oxidation of contacts, etc), to the possibilities for putting one of the transmission wires to the potential of the bodywork or to the battery plus, which has the effect of preventing correct operation of this type of transmission system.

One response to this problem is already known from the document EP-A-0,318,354 in the names of AUTOMOBILES PEUGEOT, AUTOMOBILES CITROEN and REGIE NATIONALE DES USINES RENAULT. In this document, capacitive coupling of the transmission in Polling mode between the various elements of the vehicle is used.

Hence it is possible to make the device described in this document operate according to a normal, differential, or degraded, mode on the basis of the information transiting on one of the information transmission lines.

However, this device is limited to certain applications and is not applicable, for example, to a multi-master information transmission network.

In fact, in a network of this type, all the elements linked to the network can access the transmission lines in order to impose their message on the-latter and it is therefore important to ensure good diffusion of the message and good coherence thereof for all the elements.

The solution proposed in the preceding document cannot resolve the different problems linked to the different defect modes in this type of network.

SUMMARY OF THE INVENTION

The object of the invention is thus to resolve these problems by proposing an information transmission device which is simple, reliable and makes it possible to ensure adequate information transmission even when one of the transmission lines is disturbed and which is applicable, in particular, to a multi-master network.

To this end, the subject of the invention is a device for differential-mode information transmission between at least two elements of a motor vehicle, linked by two information transmission lines each of which comprises information sending means and information reception means, linked to a protocol handler, characterised in that the reception means of each element comprise three comparators, a first receiving as input the signals transiting on the two information transmission lines, a second receiving as input the signals transiting on an information transmission line and a third receiving as input the signals transiting on the other information transmission line and, interposed between the output of these comparators and the information input of the protocol handler, means of selective connection of the output of the first comparator or of the output of means for logically combining the outputs of the second and third comparators, to the information input of the protocol handler, under the control of the latter as a function of the state of the signals present at its information input, in order to permit operation of the device in normal differential mode and in degraded mode on the basis of information transiting on one of the transmission lines.

According to one embodiment, the selective connection means comprise a multiplexer whose output is linked to the information input of the protocol handler, whose inputs receive the output of the first comparator and the output of the means for logically combining the outputs of the second and third comparators and driven by a control output of the protocol handler.

BRIEF DESCRIPTION OF THE DRAWINGS

The invention will be better understood with the aid of the description which will follow given solely by way of example and with reference to the attached drawings in which.

DESCRIPTION OF THE PREFERRED EMBODIMENTS

Figure 1:
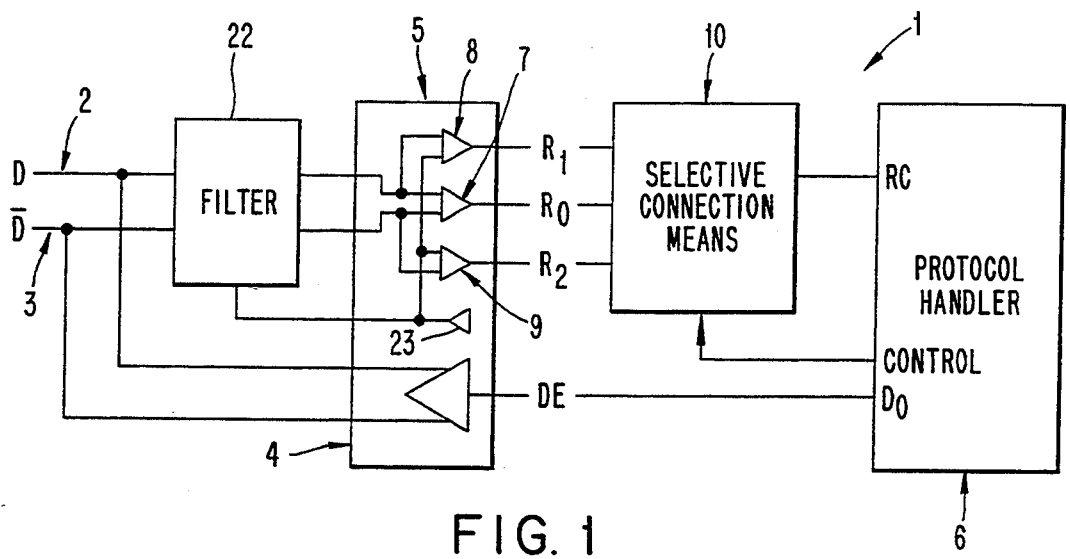
FIG. 1 represents a block diagram of an element forming part of an information transmission device according to the invention.

As can be seen in these figures, a differential-mode information transmission device, according to the invention, makes it possible to transmit information between at least two elements of a motor vehicle linked by two information transmission lines. For reasons of clarity, only one element is represented in FIG. 1 and is designated by the general reference 1. The other element or elements of the device exhibit a similar structure. The differential-mode information transmission lines are designated by the references 2 and 3.

Each element comprises information sending means 4 and information reception means 5 linked to a protocol handler designated by the general reference 6 in these figures and well known in the state of the art.

According to the invention, the information reception means of each element comprise three comparators 7, 8 and 9 which receive as inputs the signals transiting on the information transmission lines 2 and 3 through filter 22, and are biased by bias amplifier 23.

A first comparator, designated by the reference 7, receives as input the signals transiting on the two information transmission lines 2 and 3.

A second comparator, designated by the reference 8, receives as input the signals D transiting on an information transmission line and, more particularly, on line 2.

A third comparator designated by the reference 9, received as input the signals D transiting on the other information transmission line, that is to say on line 3.

The outputs of these comparators 7, 8 and 9 are referenced R0, R1 and R2, respectively.

Moreover, these information reception means 5 also comprise, interposed between the output of these comparators and the information input RC of the protocol handler 6, means 10 for selective connection of the output R0 of the first comparator 7 or of the output of means for logically combining the outputs R1 and R2 of the second and third comparators 8 and 9, to the information input RC of the protocol handler 6.

This selective connection of one or the other of these outputs to the information input of the protocol handler 6, is controlled by the latter as a function of the state of the signals present at its information input, in order to permit operation of the device in normal differential mode and in degraded mode on the basis of information transiting on one of the information transmission lines 2 and 3, as will be described in more detail below.

This control results from the detection, by the protocol handler 6, of defects in the signals present at its information input, these defects possibly resulting either from the absence of coherent transmission during a predetermined time, for example 150 ms, or from a blocking of the information item in a dominant state.

Figure 2:
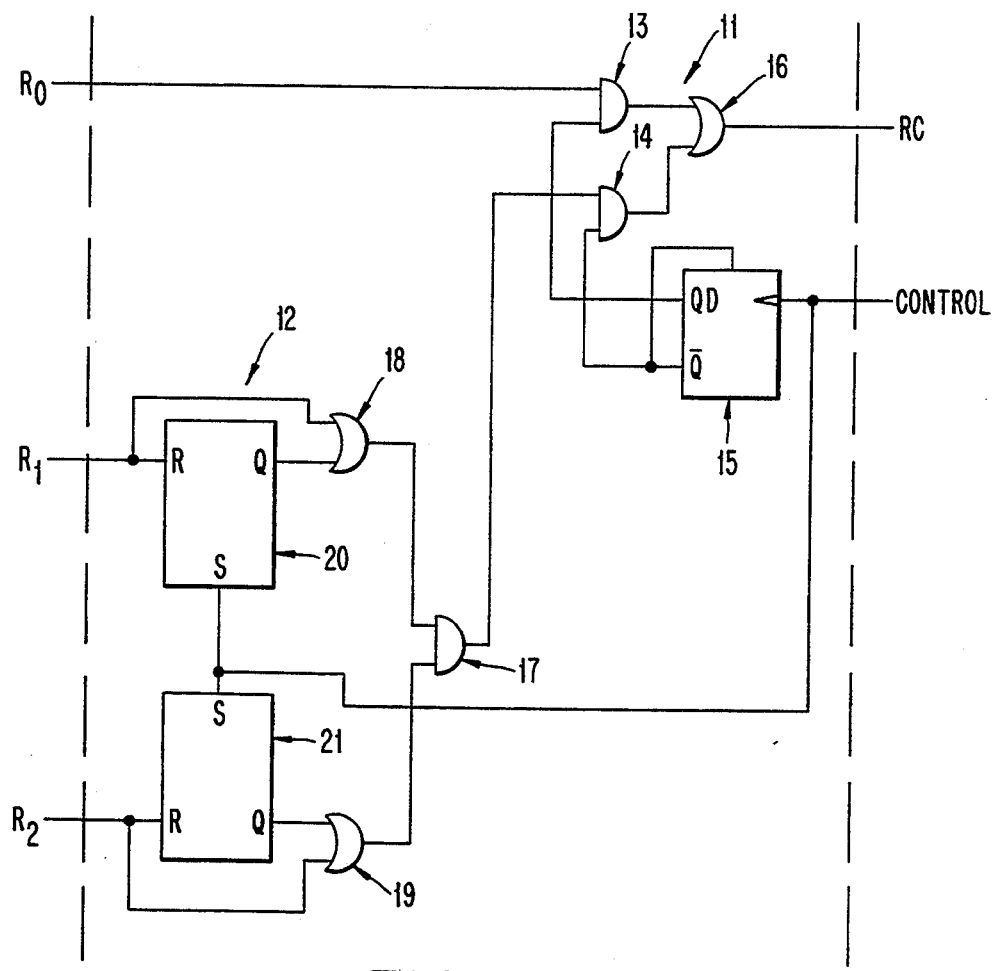
FIG. 2 represents an electrical diagram of an embodiment of selective connection means and of logic combination means forming part of a device according to the invention.

As can be seen in FIG. 2, the selective connection means 6 in fact comprise a multiplexer 11 whose output is linked to the information input RC of the protocol handler 6 and whose inputs receive the output R0 of the first comparator 7 and the output of means 12 for logically combining the outputs R1 and R2 of the second and third comparators 8 and 9, this multiplexer 11 being driven by a control output of the protocol handler 6.

More particularly, the multiplexer 11 comprises a first and a second AND gate designated by the references 13 and 14, respectively. One input of the first AND gate 13 is linked to the Q output of a D flip-flop 15 while the other input of this first AND gate 13 is linked to the output R0 of the first comparator 7.

One input of the second AND gate 14 is linked to the $\overline{Q}$ inverted output of the D flip-flop 15 while the other input of this second AND gate 14 is linked to the output of the logic combination means 12.

Moreover, the clock input of the flip-flop 15 is linked to the control output of the protocol handler 6 and the outputs of the first and second AND gates 13 and 14 are linked to the inputs of a first OR gate 16 whose output is linked to the information input RC of the protocol handler 6.

The means of combining 12 the outputs of the second and third comparators 8 and 9 produce logic AND and OR combinations of these outputs R1 and R2.

As can be seen in this FIG. 2, the combination means 12 comprises a third AND gate 17 whose output is linked to the corresponding input of the second AND gate 14 of the multiplexer 11 and whose inputs are linked to the outputs of second and third OR gates 18 and 19. One input of the second OR gate 18 is linked to the output R1 of the second comparator 8, while the other input of this second OR gate 18 is linked to the Q output of a first RS flip-flop 20, whose R input is also linked to the output R1 of the second comparator 8.

Moreover, one input of the third OR gate 19 is linked to the output R2 of the third comparator 9 while the other input of this third OR gate 19 is linked to the Q output of a second RS flip-flop 21, whose R input is linked to the output R2 of the third comparator 9.

The S inputs of the first and second RS flip-flops 20 and 21 are linked to the control output of the protocol handler 6.

Hence, the gates 13, 14 and 16 form a multiplexer 11 making it possible to obtain, at the output of the gate 16 either the output R0 of the first comparator 7 or the result of the combination of the outputs R1 and R2 of the second and third comparators 8 and 9.

This multiplexer 11 is controlled by the flip-flop 15 mounted as a divide-by-two circuit, its $\overline{Q}$ output being linked to its D input and driven by the protocol handler 6.

On each pulse of the control signal from the protocol handler 6, the Q and $\overline{Q}$ outputs of this flip-flop 15 change value, thus connecting either the signal R0 or a logic combination of the signals R1 and R2 to the information input of the protocol handler 6.

The set of gates and of RS flip-flops forming part of the combination means 12 make it possible to produce a logic AND between the signals R1 and R2 or to select the signal R1 or the signal R2.

On each pulse of the control signal, the flip-flops 20 and 21 are initialised, thus holding the OR gates 18 and 19 in the 1 state.

If the signal R1 is held at 0 (dominant), this signal cannot pass through the flip-flop 20.

In the event that the signal transiting on the other line, that is to say the signal R2, is correct, a level 1 of this signal R2 unblocks the corresponding flip-flop 21 and the gate 19, such that this signal can pass through the gate 17 towards the rest of the circuit and thus the protocol handler 6.

The choice of the signal used depends on the state of the signals on the transmission lines 2 and 3, that is to say D and $\overline{D}$.

The table below summarises the various possible defect cases:

| | |
|---|---|
| violent parasites | R0 |
| ground offset | R0 |
| break in a D (DATA) wire | R1, R1 and R2 |
| break in a D (DATA) wire | R2, R1 and R2 |
| putting $\overline{D}$ to the plus | R2, R1 and R2 |
| putting D to the plus | R1, R1 and R2 |
| grounding of D | R2 |
| grounding of $\overline{D}$ | R1 |

Hence, by using the R0, R1 and R2 signals, it is possible to treat six defect cases out of eight and the two latter cases are treated by using the signal R1 or the signal R2.

The choice of the output signal thus follows the logic:
1) Choice between R0 and (R1 and R2)
2) In the event that (R1 and R2) has been chosen, and that operation is still not provided, a choice is made between R1 or R2, which permits the device still to operate, at least in degraded mode.

We claim:

1. A device for differential-mode information transmission between at least two elements of a motor vehicle, linked by two information transmission lines, each of the elements comprising information sending means and information reception means, linked to a protocol handler, wherein the reception means of each element comprise a first comparator receiving as input signals transiting on the two information transmission lines, a second comparator receiving as input signals transiting on one information transmission line and a third comparator receiving as input signals transiting on the other information transmission line and, interposed between output of the first, second and third comparators and an information input of the protocol handler, means for selective connection of an output of the first comparator or of an output of means for logically combining outputs of the second and third comparators, to the information input of the protocol handler, under control of the protocol handler as a function of the state of signals present at the information input of the protocol handler, in order to permit operation of the device in normal differential mode and in degraded mode on the basis of information transiting on one of the transmission lines.

2. The device according to claim 1, wherein the selective connection means includes a multiplexer whose output is linked to the information input of the protocol handler, and whose inputs receive the output of the first comparator and the output of the means for logically combining the outputs of the second and third comparators, the multiplexer being driven by a control output of the protocol handler.

3. The device according to claim 2, wherein said multiplexer comprises a first and a second AND gate, one input of the first gate being linked to a Q output of a D flip-flop while the other input of the first gate is linked to the output of the first comparator, one input of the second AND gate being linked to a $\overline{Q}$ inverted output of the D flip-flop while the other input of the second AND gate is linked to the output of the means for logically combining the outputs of the second and third comparators, a clock input of the flip-flop being linked to a control output of the protocol handler, while outputs of the first and second AND gates are linked to inputs of a first OR gate whose output is linked to the information input of the protocol handler.

4. The device according to claim 3, wherein the means for logically combining the outputs of the second and third comparators produce logic AND and OR combinations of these outputs.

5. The device according to claim 4, wherein the means for logically combining the outputs of the second and third comparators comprises a third AND gate whose output is linked to a corresponding input of the second AND gate of the multiplexer and whose inputs are linked to outputs of second and third OR gates, one input of the second OR gate being linked to the output of the second comparator while the other input of the second OR gate is linked to a Q output of a first RS flip-flop whose R input is linked to the output of the second comparator, one input of the third OR gate being linked to the output of the third comparator while the other input of the third OR gate is linked to the Q output of a second RS flip-flop whose R input is linked to the output of the third comparator, S inputs of the first and second RS flip-flops being linked to the control input of the protocol handler.

6. The device according to claim 1, wherein the means for logically combining the outputs of the second and third comparators produce logic AND and OR combinations of these outputs.

7. The device according to claim 2, wherein the means for logically combining the outputs of the second and third comparators produce logic AND and OR combinations of these outputs.

8. An apparatus for differential-mode information transmission, comprising:
two information transmission lines;
at least two elements of a motor vehicle linked by said transmission lines, each of said elements comprising
information sending means for sending information over said transmission lines and
information reception means for receiving information from said transmission lines, wherein the reception means of each element include a first comparator receiving as input signals transiting on the two information transmission lines, a second comparator receiving as input signals transiting on one information transmission line and a third comparator receiving as input signals transiting on the other information transmission line;
means for logically combining outputs of said second and third comparators;
a protocol handler; and
means, interposed between outputs of said first, second and third comparators and an information input of said protocol handler, for selectively connecting an output of the first comparator or an output of said means for logically combining the outputs of said second and third comparators, to an information input of said protocol handler, under control of said protocol handler as a function of the state of signals present at the information input of the protocol handler, in order to permit operation of the device in normal differential mode and in degraded mode on the basis of information transiting on one of the transmission lines.

9. The apparatus according to claim 8, wherein said selective connection means includes a multiplexer, an output of which is linked to said information input of said protocol handler and inputs of which receive an output of said first comparator and an output of the means for logically combining outputs of the second and third comparators, said multiplexer being driven by a control output of the protocol handler.

10. The apparatus according to claim 9, wherein said multiplexer comprises a first and a second AND gate, one input of the first gate being linked to a Q output of a D flip-flop while the other input of the first gate is linked to an output of the first comparator, one input of the second AND gate being linked to a $\overline{Q}$ inverted output of the D flip-flop while the other input of the second AND gate is linked to an output of the means for logically combining the outputs of the second and third comparators, a clock input of said D flip-flop being linked to a control output of said protocol handler, while outputs of the first and second AND gates are linked to inputs of a first OR gate whose output is linked to said information input of said protocol handler.

11. The device according to claim 8, wherein said means for logically combining said outputs of the second and third comparators produce logic AND and OR combinations of said outputs.

12. The device according to claim 10, wherein the means for logically combining the outputs of the second and third comparators comprises a third AND gate whose output is linked to a corresponding input of the second AND gate of the multiplexer and whose inputs are linked to outputs of second and third OR gates, one input of the second OR gate being linked to the output of the second comparator while the other input of the second OR gate is linked to a Q output of a first RS flip-flop whose R input is linked to the output of the second comparator, one input of the third OR gate being linked to the output of the third comparator while the other input of the third OR gate is linked to the Q output of a second RS flip-flop whose R input is linked to the output of the third comparator, S inputs of the first and second RS flip-flops being linked to the control input of the protocol handler.

* * * * *

UNITED STATES PATENT AND TRADEMARK OFFICE
CERTIFICATE OF CORRECTION

PATENT NO. : 5,347,543

DATED : Sep. 13, 1994

INVENTOR(S) : Jean-Luc Lecocq and Pierre Magne

It is certified that error appears in the above-identified patent and that said Letters Patent is hereby corrected as shown below:

Title page, item
[75] Inventors: Jean-Luc Lecocq, Sevres; Pierre Magne, Courbevoie, both of France Signed and Sealed this Third Day of January, 1995

Attest:

BRUCE LEHMAN

*Attesting Officer*     *Commissioner of Patents and Trademarks*